United States Patent
Miura et al.

(10) Patent No.: US 9,171,233 B2
(45) Date of Patent: Oct. 27, 2015

(54) BIOMETRIC INFORMATION PROCESSING DEVICE AND BIOMETRIC INFORMATION PROCESSING PROGRAM

(75) Inventors: Naoto Miura, Kokubunji (JP); Takafumi Miyatake, Hachioji (JP); Akio Nagasaka, Kokubunji (JP); Harumi Kiyomizu, Kokubunji (JP)

(73) Assignee: HITACHI, LTD., Tokyo (JP)

( * ) Notice: Subject to any disclaimer, the term of this patent is extended or adjusted under 35 U.S.C. 154(b) by 1060 days.

(21) Appl. No.: 11/492,788

(22) Filed: Jul. 26, 2006

(65) Prior Publication Data

US 2007/0177767 A1    Aug. 2, 2007

(30) Foreign Application Priority Data

Feb. 2, 2006 (JP) .................................. 2006-25211

(51) Int. Cl.
  *G06K 9/00* (2006.01)
  *G06K 9/62* (2006.01)
(52) U.S. Cl.
  CPC ................ *G06K 9/6255* (2013.01); *G06K 9/00* (2013.01); *G06K 9/00919* (2013.01); *G06K 2009/00932* (2013.01)
(58) Field of Classification Search
  USPC ........................................................ 392/115
  See application file for complete search history.

(56) References Cited

U.S. PATENT DOCUMENTS

| 5,787,185 A | 7/1998 | Clayden |
| 5,793,881 A | 8/1998 | Stiver et al. |
| 5,862,246 A | 1/1999 | Colbert |
| 6,011,860 A | 1/2000 | Fujieda et al. |
| 6,993,160 B2 | 1/2006 | Miura et al. |
| 7,181,048 B2 | 2/2007 | Blume |
| 7,273,170 B2 | 9/2007 | Katsumata et al. |
| 7,327,561 B2 | 2/2008 | Chen |
| 7,327,861 B2 | 2/2008 | Choshi et al. |
| 7,359,531 B2 | 4/2008 | Endoh et al. |
| 7,376,839 B2 | 5/2008 | Carta et al. |
| 2002/0028004 A1 | 3/2002 | Miura et al. |

(Continued)

FOREIGN PATENT DOCUMENTS

| DE | 44 21 237 | 12/1994 |
| EP | 976 897 A1 | 2/2000 |

(Continued)

OTHER PUBLICATIONS

U.S. Appl. No. 11/492,895, filed Jul. 2006, Miura et al.

*Primary Examiner* — Kim Vu
*Assistant Examiner* — Fred Hu
(74) *Attorney, Agent, or Firm* — Mattingly & Malur, PC

(57) ABSTRACT

Provided is a small-sized, flat, vein authentication device of high authentication accuracy by photographing a living body several times and thus obtaining as registration data plural images that are picked up at different positions. A biometric information processing device of this invention comprising an image pickup device, which picks up a vein image, an image computing unit, which processes the vein image picked up by the image pickup device, an interface on which a part of a living body to be picked up is placed, and a light source, which emits infrared light. The biometric information processing device is further comprised of a sensor unit, which detects the presence or absence of a subject picked up by the image pickup device, a unit to obtain plural images as registration data, and a unit to select optimum registration data out of images obtained as registration data.

8 Claims, 12 Drawing Sheets

(56) References Cited

U.S. PATENT DOCUMENTS

| | | | |
|---|---|---|---|
| 2002/0067845 A1 | 6/2002 | Griffis | |
| 2003/0086588 A1 | 5/2003 | Shinada et al. | |
| 2003/0103686 A1 | 6/2003 | Ogura | |
| 2004/0031908 A1 | 2/2004 | Neveux et al. | |
| 2004/0184641 A1 | 9/2004 | Nagasaka et al. | |
| 2004/0234107 A1* | 11/2004 | Machida et al. | 382/107 |
| 2005/0047632 A1* | 3/2005 | Miura et al. | 382/124 |
| 2005/0148876 A1 | 7/2005 | Endoh et al. | |
| 2005/0185828 A1* | 8/2005 | Semba et al. | 382/124 |
| 2005/0205667 A1* | 9/2005 | Rowe | 235/382 |
| 2006/0023919 A1 | 2/2006 | Okamura et al. | |
| 2007/0036399 A1 | 2/2007 | Matsumura et al. | |
| 2007/0058841 A1 | 3/2007 | Miura et al. | |
| 2007/0085655 A1* | 4/2007 | Wildman et al. | 340/5.53 |
| 2008/0115981 A1* | 5/2008 | Bechtel | 178/19.01 |

FOREIGN PATENT DOCUMENTS

| | | | | |
|---|---|---|---|---|
| EP | 1 271 389 A2 | 1/2003 | | |
| EP | 1 376 465 A | 1/2004 | | |
| JP | 10-289304 A | 10/1998 | | |
| JP | 2001-184507 | 7/2001 | | |
| JP | 2002-083300 | 3/2002 | | |
| JP | 2002-083300 A1 * | 3/2002 | | G06T 7/00 |
| JP | 2002083300 A * | 3/2002 | | |
| JP | 2003-242492 | 8/2003 | | |
| JP | 2004-086866 | 3/2004 | | |
| JP | 2004-131927 | 4/2004 | | |
| JP | 2004-265269 | 9/2004 | | |
| JP | 2004-265369 | 9/2004 | | |
| JP | 2005-10860 A | 1/2005 | | |
| JP | 2003-300712 A | 3/2005 | | |
| JP | 2005-63020 A | 3/2005 | | |
| JP | 2005-71118 A | 3/2005 | | |
| WO | 00/39743 A1 | 7/2000 | | |
| WO | 00/39744 A1 | 7/2000 | | |
| WO | WO 02/099393 | 12/2002 | | |
| WO | 2005/013183 A2 | 2/2005 | | |
| WO | WO 2005/017828 | 2/2005 | | |
| WO | WO 2006/134669 A1 | 12/2006 | | |

* cited by examiner

| S | P1 | P2 | P3 | P4 | P5 |
|---|---|---|---|---|---|
| P1 | | 98 | .... | 90 | .... |
| P2 | 98 | | .... | 26 | .... |
| P3 | .... | .... | | .... | .... |
| P4 | 90 | 26 | .... | | .... |
| P5 | .... | .... | .... | .... | |

FIG. 7A

| D1 | P1 | P2 | P3 | P4 | P5 |
|---|---|---|---|---|---|
| P1 | | -2 | .... | +2 | .... |
| P2 | +2 | | .... | +8 | .... |
| P3 | .... | .... | | .... | .... |
| P4 | -2 | -8 | .... | | .... |
| P5 | .... | .... | .... | .... | |

FIG. 7B

| D2 | P1 | P2 | P3 | P4 | P5 |
|---|---|---|---|---|---|
| P1 | \ | -2 |  | +2 |  |
| P2 | +2 | \ |  | +4 |  |
| P3 |  |  | \ |  |  |
| P4 | -2 | -4 |  | \ |  |
| P5 |  |  |  |  | \ |

FIG. 8A

| D2 | P1 | P2 | P3 | P4 | P5 |
|---|---|---|---|---|---|
| P1 | \ | -2 | +6 | +2 | +3 |
| P2 | +2 | \ | .... | .... | .... |
| P3 | -6 | .... | \ | .... | .... |
| P4 | -2 | .... | .... | \ | .... |
| P5 | -3 | .... | .... | .... | \ |

FIG. 8B

BIOMETRIC INFORMATION PROCESSING DEVICE AND BIOMETRIC INFORMATION PROCESSING PROGRAM

CLAIM OF PRIORITY

The present application claims priority from Japanese patent application 2006-25211 filed on Feb. 2, 2006, the content of which is hereby incorporated by reference into this application.

BACKGROUND OF THE INVENTION

This invention relates to a biometric information processing device for authenticating individuals, and more specifically, to an authentication technique using venous information of a living body.

Security of personal information is gaining greater importance in recent years. Biometrics authentication is attracting attention as individual authentication technology for ensuring security. Biometrics authentication is authentication technology that uses physiological information of a person, and is excellent in terms of convenience and preservation of confidentiality.

Examples of known conventional biometrics authentication technology include authentication using a fingerprint, iris, voice, face, or vein on the back of a hand or on the palm side of a finger. In particular, vein biometric authentication using a vein is highly fraud-proof in terms of use of in vivo information.

The description given below focuses on finger vein authentication devices.

A finger vein authentication device first irradiates a finger with infrared light, which is scattered inside the finger and then transmitted to the outside. The finger vein authentication device picks up the infrared light transmitted through the palm side of the finger.

Since hemoglobin in blood absorbs infrared light more than its surrounding tissues, the image picked up by the finger vein authentication device is a visualization of blood vessels running under the skin on the palm side of the finger (i.e., finger veins) as a dark shadow pattern (i.e., finger vein pattern).

Features of the finger vein pattern are registered in the finger vein authentication device in advance.

For authentication, the finger vein authentication device picks up an image of the user's finger. The finger vein authentication device accomplishes individual authentication by obtaining a correlation between a finger vein pattern of the image picked up and the features registered in advance.

However, conventional finger vein authentication devices pick up an image of a finger inserted into the finger vein authentication devices. Therefore, users feel reluctant to insert a finger into the closed interior space of a finger vein authentication device.

Conventional finger vein authentication devices need to be tall enough to accommodate a light source placed beside a finger as disclosed in JP 2004-265269 A. The applicant of this application has filed a patent application for a contrasting system which uses in authentication a spectrum measured with a light source and a detector that are placed on the same side as a measurement subject living body.

With the background art described above, accurate authentication is not possible in a case where a finger presented for matching is positioned differently from when it is registered, thus casting a different pattern from the image picked up upon registration. A structure for regulating the finger position is therefore necessary in order to improve the authentication accuracy. This takes form as finger rests and other physical structures for directing where to place a finger in a device disclosed in JP 2004-265269 A.

A configuration disclosed in PCT/JP2005/011184 enables an authentication device to have a small size, but its substantially flat surface on which a living body is placed makes it difficult to add finger rests and other similar physical structures. Without such structures, users have no way of knowing the right place to put a living body, and the position difference between registered biometric information and biometric information presented for authentication leads to incorrect authentication.

SUMMARY OF THE INVENTION

It is therefore an object of this invention to reduce a biometric authentication device in size while avoiding lowering of the authentication rate that results from a user misplacing a living body on the device.

A representative aspect of this invention disclosed herein is: A biometric information processing device comprised of a light source, which irradiates with light a part of a living body placed on a placement surface, a image pickup unit, which is placed on the light source side with respect to the part of the living body to pick up light transmitted through the living body as a registration image candidate, and a processing device, which extracts a blood vessel pattern from the picked up registration image candidate.

The processing unit calculates how large a position difference is between blood vessel patterns extracted from the picked up images in the manner described above, and determines a given number of blood vessel patterns where the position difference is large as registered patterns. Alternatively, the processing unit obtains a new registration image candidate once judgment is made as to whether the living body is lifted from the placement surface and returned to the placement surface after one registration image candidate is obtained, or the living body is misplaced on the placement surface.

A finger vein authentication device according to this invention eliminates the need for strict positioning on a surface where a living body is placed for authentication, and accordingly is improved in use-friendliness as well as in recognition rate.

BRIEF DESCRIPTION OF THE DRAWINGS

The present invention can be appreciated by the description which follows in conjunction with the following figures, wherein:

FIG. 7A and FIG. 7B are an explanatory diagrams of the registration data selection processing of the authentication processing unit according to the first embodiment of this invention;

FIG. 8A and FIG. 8B are an explanatory diagrams of the registration data selection processing of the authentication processing unit according to the first embodiment of this invention;

DETAILED DESCRIPTION OF THE PREFERRED EMBODIMENTS

Embodiments of this invention will be described below with reference to drawings. In the embodiments of this patent application, a finger vein authentication device is described in particular, but this invention is also applicable to a case where a palm or other living body parts are read.

Figure 1:
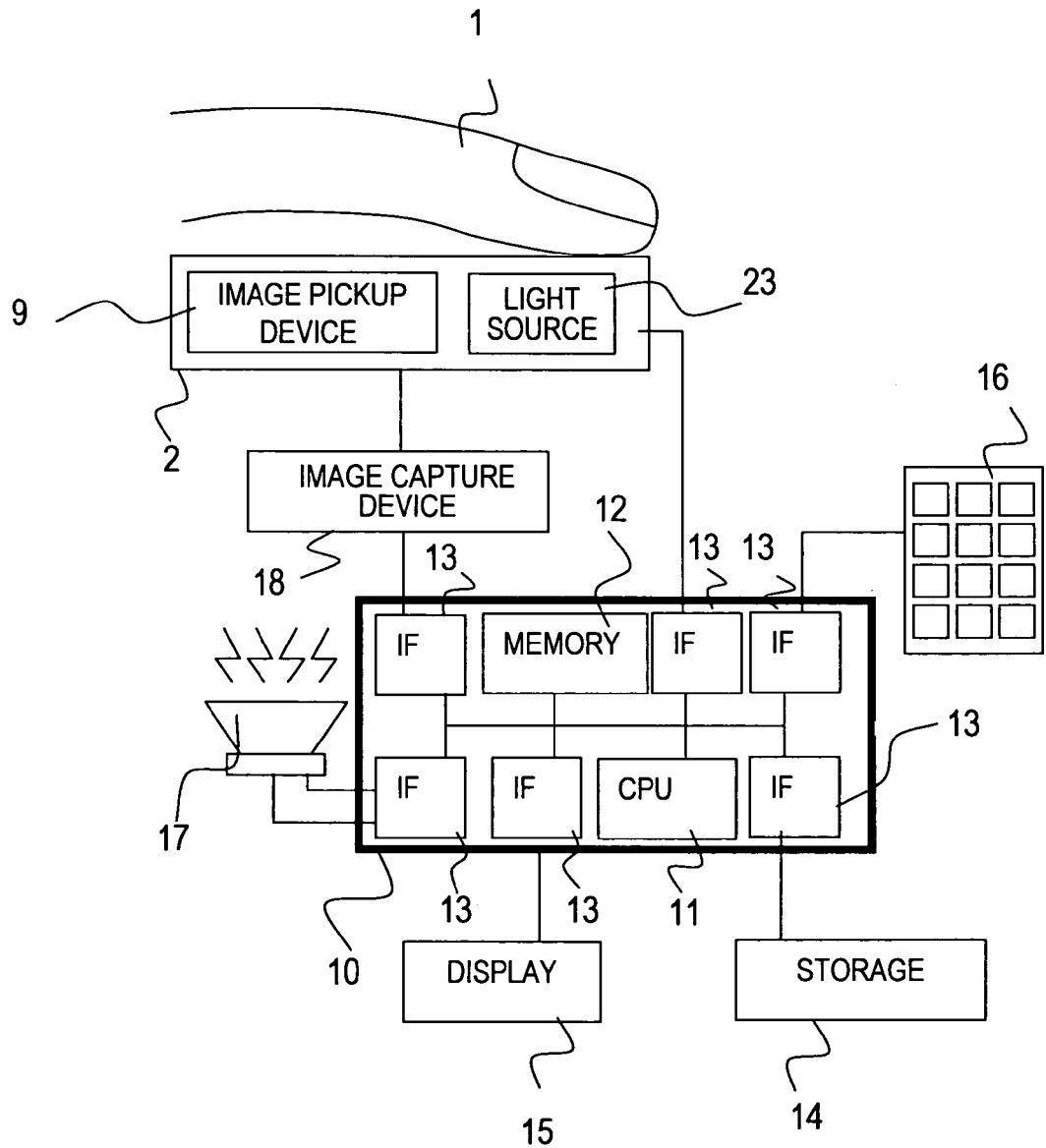
FIG. 1 is a configuration diagram of an authentication system according to a first embodiment of this invention.

FIG. 1 is a configuration diagram of an authentication system according to a first embodiment of this invention.

The authentication system contains an input device 2, an authentication processing unit 10, a storage 14, a display 15, an input unit 16, a speaker 17, and an image capture unit 18. The input device 2 contains a light source 23 and an image pickup device 9.

The light source 23 is, for example, an infrared LED, and irradiates a finger 1 placed on the input device 2 with infrared light. The image pickup device 9 picks up an image of the finger 1 placed on the input device 2.

The image capture unit 18 inputs an image picked up by the image pickup device 9 of the input device 2 into the authentication processing unit 10.

The authentication processing unit 10 contains a CPU 11, a memory 12, and interfaces (IFs) 13.

The CPU 11 performs various types of processing by executing programs stored in the memory 12. The memory 12 stores programs executed by the CPU as will be described later with reference to FIG. 2. The memory 12 also temporarily stores an image entered by the image capture unit 18.

The interfaces 13 are connected to devices external to the authentication processing unit 10. To be specific, the interfaces 13 are connected to the input device 2, the storage 14, the display 15, the input unit 16, the speaker 17, the image capture unit 18, and others.

The storage 14 stores in advance user crosscheck data, which is information for verifying users such as finger vein pattern images. A finger vein pattern image is an image of blood vessels running under the skin surface on the palm side of a finger (i.e., finger veins) that is picked up as a dark shadow pattern.

The display 15 is, for example, a liquid crystal display, and displays information received from the authentication processing unit 10.

The input unit 16 is, for example, a keyboard, and sends information entered by a user to the authentication processing unit 10. The speaker 17 outputs, in audio, information received from the authentication processing unit 10.

Described below is authentication processing by an authentication system of this embodiment with reference to FIG. 1 and flow chart FIG. 10.

First, a user requesting authentication presents the finger 1 to the input device 2. The light source 23 installed in the input device 2 irradiates the finger 1 with infrared light, which is scattered in every direction within the finger 1.

The image pickup device 9 installed in the input device 2 picks up the infrared light exiting the palm side of the finger 1. The image pickup device 9 inputs the image picked up to the authentication processing unit 10 via the image capture unit 18.

Figure 5:
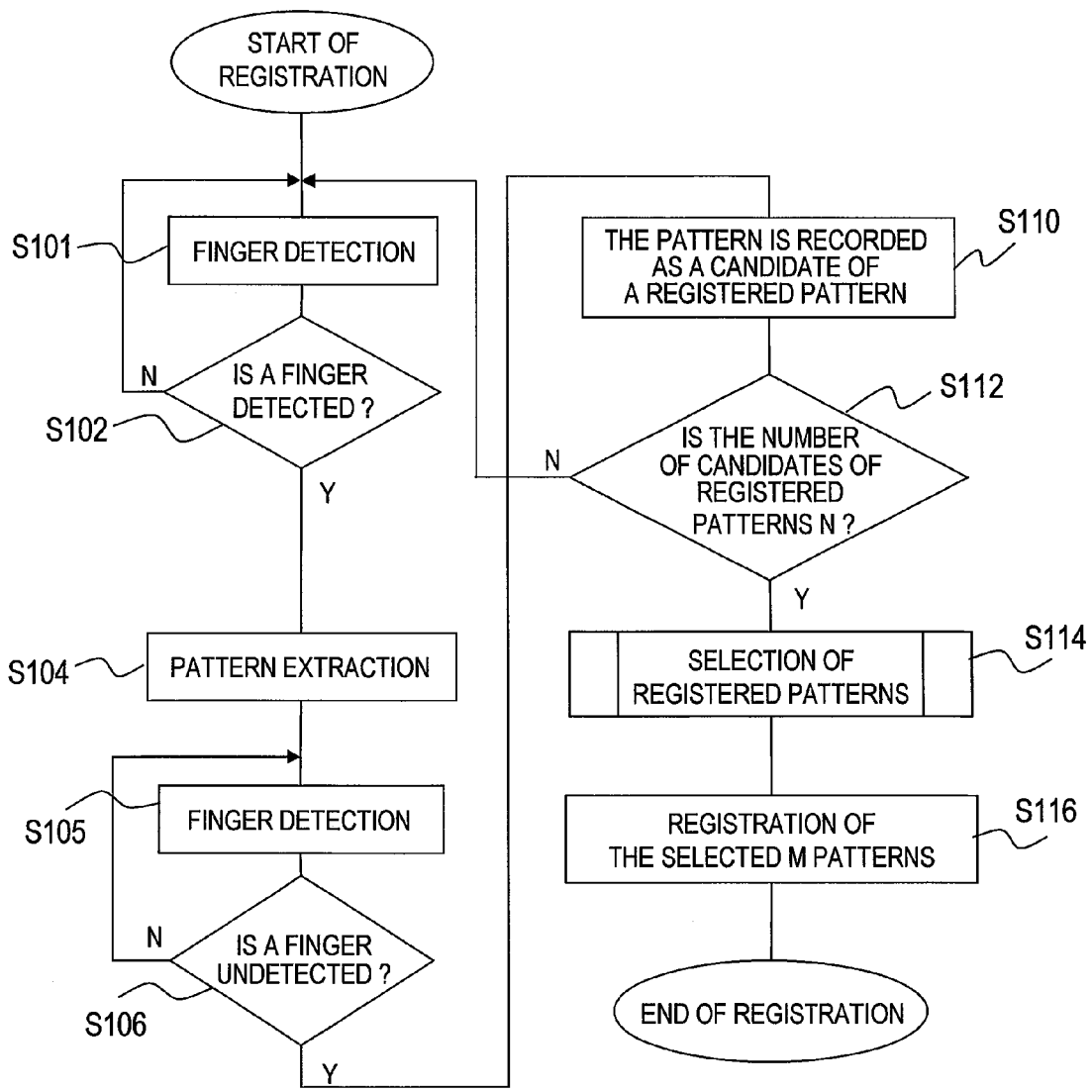
FIG. 5 is a flow chart for registration processing of the authentication processing unit according to the first embodiment of this invention.

The authentication processing unit 10 stores the entered image in the memory 12. From the image stored in the memory 12, the authentication processing unit 10 extracts a vein pattern (S202). Vein pattern extraction processing (S104), which will be described later with reference to FIG. 5, is one of methods that can be employed in S202 to extract a vein pattern. A feature amount extracted in S202 either can be image information about the spatial distribution of a vein pattern or vein structural information about end points, branching points, and the like. Finger vein feature data is thus extracted.

The authentication processing unit 10 next obtains, from the storage 14, registration data which is stored in advance in the storage 14. The authentication processing unit 10 may retrieve from the storage 14 only registration data that is associated with information entered from the input unit 16 (e.g., user ID). More than one pattern may be registered as registration data for one living body. The obtained authentication information is next stored in the memory 12.

The authentication processing unit 10 next calculates the similarity between the extracted feature data and the registration data obtained from the storage 14 (S204). The similarity calculation may employ a method in which the similarity is estimated by overlapping feature patterns as images and summing up pixel value differences. In another employable method, structural feature amounts such as branching points and end points are obtained from feature patterns, which are drawn in lines, to estimate the number of corresponding feature points or branching points and the matching degree in terms of direction or the like.

The authentication processing unit 10 then judges whether or not the obtained similarity is high enough to make the extracted feature data and the registration data the same pattern (S206). When there are plural patterns registered as registration data for one living body, one that has the highest similarity is employed. Once a user is recognized as a registered user, an authentication processing (S208), which varies depending on the authentication system in question, is executed. Examples of the authentication processing include log-in to a personal computer, unlocking of a door, and the commencement of a monetary transaction through an automatic teller machine (ATM). On the other hand, in the case where all of patterns registered for one living body are judged to have low similarity, a new finger vein image of the finger placed on the authentication device is picked up and the processing returns to the pattern extraction processing of S202. Repeating the authentication processing in succession like this raises the probability of identifying a registered user as himself/herself. The matching processing may be ended when a user is not successfully authenticated after repeating the authentication processing a given number of times. This reduces the possibility of accidentally authenticating an unregistered person.

In the case where plural patterns are registered as registration data for one living body, the authentication processing may be executed only when the registered pattern that has the highest similarity exceeds a threshold as described above. In this way, the probability of authenticating a registered user as himself/herself is raised. Also, the authentication processing may be executed when several patterns registered as registration data exceed a threshold at the same time. This lowers the probability of erroneously authenticating an unregistered person. These measures can be set according to the security level of the authentication system in question. The authentication system of this embodiment checks the authenticity of users in the manner described above.

The authentication processing is executed correctly when a vein pattern registered in advance and a presented vein pattern are a complete match. However, users cannot always put a living body in the same place. When a user fails to position a living body for authentication exactly the same way as when the living body is registered, it creates a position difference between the registered vein pattern and the presented vein pattern, and a feature amount present in one of the patterns may not be in the other pattern. Such patterns show low similarity to each other. Generally speaking, the similarity drops more steeply as the position difference grows larger.

Figure 2:
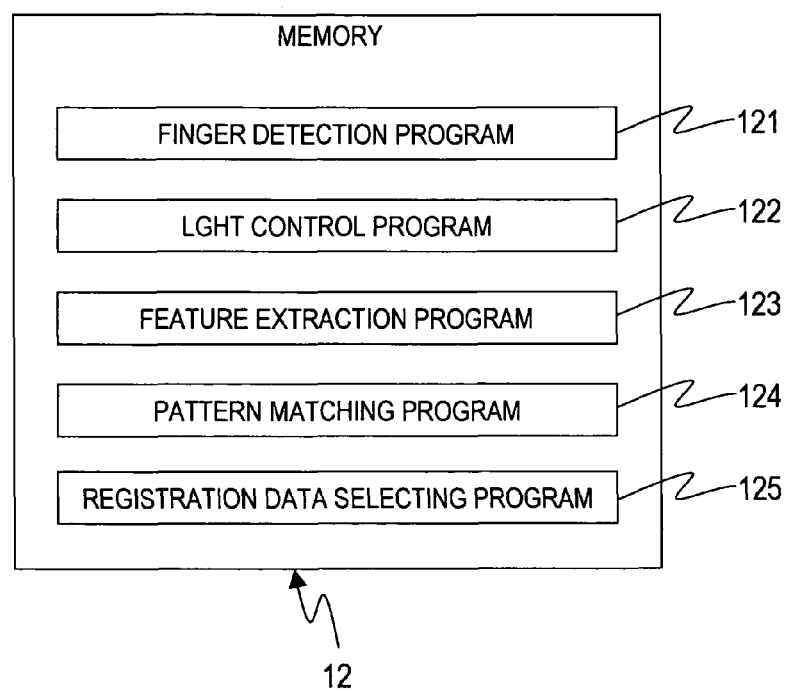
FIG. 2 is a block diagram of a memory in an authentication processing unit according to the first embodiment of this invention.

FIG. 2 is a block diagram of the memory 12 in the authentication processing unit 10 according to the first embodiment of this invention.

The memory 12 stores a finger detecting program 121, a light amount control program 122, a feature extracting program 123, a pattern matching program 124, a registration data selecting program 125, and the like. The finger detecting program 121 judges whether or not the finger 1 is placed on the input device 2. The light amount control program 122 controls the intensity of light emitted from the light source 23. The feature extracting program 123 extracts feature data from an image picked up by the image pickup device 9. The pattern matching program 124 checks feature data that is extracted by the feature extracting program 123 against authentication data stored in the storage 14. The registration data selecting program 125 selects, from captured pieces of feature data, plural candidates for feature data to be registered.

Figure 3A:
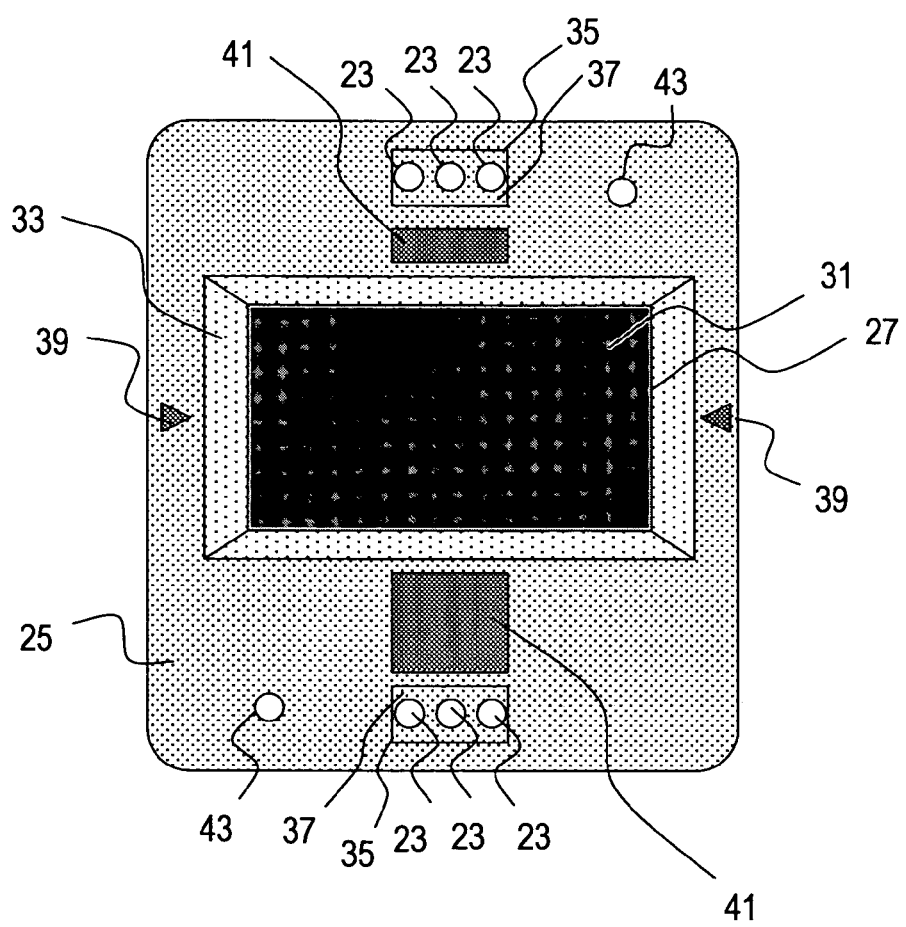
FIG. 3A is a plane view of an input device according to the first embodiment of this invention.

FIG. 3A is a plane view of the input device 2 according to the first embodiment of this invention. A front surface of the input device 2 constitutes a finger placing surface 25 where a living body whose image is to be picked up is placed. An opening 27 defined by the finger placing surface 25 is at the center of the input device 2. A clear plastic plate 31 (e.g. acrylic plate) is fit to the opening 27 to prevent dust and other foreign objects from entering the interior of the input device 2. When formed from a material that allows only infrared light to transmit, the acrylic plate 31 can serve as a shield against external light such as sunlight and fluorescent light which is undesirable in photographing a vein pattern. A slope 33 surrounding the opening 27 is formed in the finger placing surface 25 to set the acrylic plate 31 slightly lower than the level of the finger placing surface 25. This helps to prevent a contact between the finger 1 and the acrylic plate 31 when the finger 1 is placed on the input device 2. Accordingly, the blood flow is uninterrupted from a pressure on the finger 1 and the whole vein pattern is obtained without missing any part. The finger placing surface 25, which is overall a flat surface aside from a slight slope, allows the input device 2 to be mounted to instruments that cannot have a concave/convex shape due to physical limitations or for design reasons, for example, cellular phones, portable terminals such as notebook PCs and PDAs, keyboard tops, and ATM operation panels.

Light irradiation ports 35 are disposed above and below the opening 27. The light irradiation ports 35 have light sources 23 inside. The light sources 23 are devices that emit infrared light. Light source protecting acrylic plates 37 are provided in the light irradiation ports 35 to cover the light sources 23. The light source protecting acrylic plates 37 are formed from a material that has high transmittance of infrared light, and protects the light sources 23 from external force. Joint position marks 39 with which the first joint of the finger 1 is aligned are marked to the left and right of the opening 27 on the finger placing surface 25. The joint position marks 39 are a visual help to users in positioning the finger 1. Finger placing position marks 41 are marked between the light sources 23 and the opening 27 by creping portions of the finger placing surface 25 to make the portions different to touch from the rest of the finger placing surface 25. The thus formed finger placing position marks 41 enable users to confirm where to place the finger 1 visually and tactually. These structures help users to position the finger 1 by touch, thereby improving the user-friendliness. There are also guide lamps 43 near the upper right corner and lower left corner of the finger placing surface 25. The lamps 43 are, for example, LEDs. When the finger 1 is placed such that the view of the lamps 43 is not blocked, the finger 1 rests on a straight line. Various combinations of lighting or flashing patterns and light colors of the lamps 43 can be used to inform users of the state of the authentication device, for example, a standby state in which the authentication device is waiting for the finger 1 to be presented for authentication, and the success or failure of authentication.

Figure 3B:
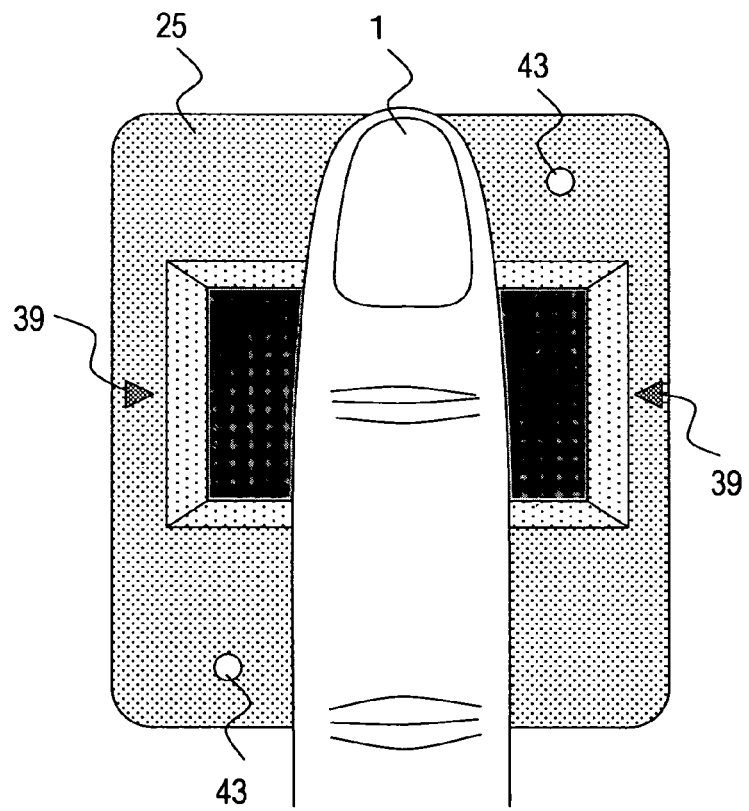
FIG. 3B is a plane view of an input device with a finger placed on the finger placing surface according to the first embodiment of this invention.

FIG. 3B shows the finger 1 placed on the finger placing surface 25 of the input device 2. As mentioned above, the finger 1 is positioned such that the finger placing position marks 41 shown in FIG. 3A are covered by the finger 1; the view of the guide lamps 43 is not blocked, and the first joint of the finger 1 is aligned with the joint position marks 39.

Figure 4:
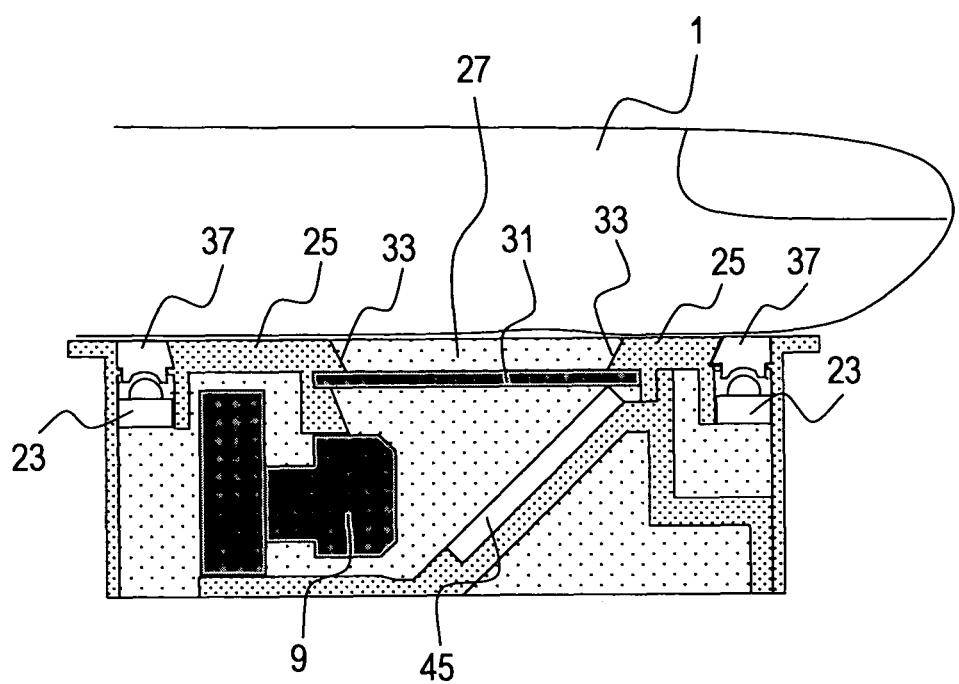
FIG. 4 is a side view of the input device according to the first embodiment of this invention.

FIG. 4 shows the internal structure of the input device 2. A mirror 45 stands at an angle inside the input device 2. The slanted mirror 45 bends the optical axis of the image pickup device 9 such that the optical axis runs through the center of the opening 27. This eliminates the need for the image pickup device 9 to be right under the opening 27 in picking up an image of a finger placed outside of the input device 2 through the opening 27, thereby making it possible to reduce the height of the input device 2. As shown in FIG. 4, with the finger 1 placed on the finger placing surface 25, the finger 1 is in close contact with the light source protecting acrylic plates 37, and as shown in FIG. 3B, the finger 1 is positioned to cover the LEDs 23. This prevents undesirable scattering of light caused by leaked light which does not enter the finger 1, and light from the light sources 23 efficiently enters the finger 1, enhances the energy efficiency of irradiation light for photographing a vein pattern. As a result, the image quality of a vein pattern photographed is improved and the recognition rate is raised.

The finger placing surface 25 is formed from or coated with a material that does not transmit infrared light to avoid transmitting or reflecting infrared light. The interior in the input device 2 of underside of the finger placing surface 25, is partitioned between the light sources 23 and the opening 27 and between the light sources 23 and the image pickup device 9 in order to prevent light emitted by the light sources 23 from escaping to the outside through other parts of the input device 2 than the light source protecting acrylic plates 37. When infrared light from the light sources 23 is leaked through the opening 27, the skin surface of a living body positioned right above the opening 27 is irradiated with the infrared light. The infrared light irradiating the living body is reflected from the skin surface and travels back to the image pickup device 9, thereby causing an image of the skin surface of the living body to mix with a vein pattern image. The pattern contrast of veins in the living body is accordingly weakened and the image quality is lowered. Employing the above-described materials and structures, this invention can prevent light emitted by the light sources 23 from reaching the image pickup device 9 directly and from escaping through the opening 27. The problem described above is thus avoided and a clear vein pattern image is photographed.

Being small in size and flat, the authentication device of this embodiment has an advantage that the degree of freedom is high in incorporating the input device 2. As shown in FIG. 3A, FIG. 3B and FIG. 4, the authentication device has a small size because its height is cut by placing light sources on the same plane as a finger placing surface and making a living body placing surface substantially flat. Adding physical projections or the like to limit where to place a living body is not desirable in a device like the one according to this embodiment since it makes the device tall. Without physical structures for regulating the living body position, on the other hand, a living body may be positioned differently in registration and matching, which causes the problem of lowered recognition rate. The influence of the position difference in registration and matching is significant especially when the reduced size of the device makes the photograph area small. This embodiment reduces the position difference by providing visual marks and changing the feel of the contact surface as described above, but they alone are not enough to ensure that users can always locate the correct finger putting place. The inventors of this invention have therefore thought of giving the authentication device of the first embodiment a measure of performing authentication that tolerates a finger position difference for improved authentication accuracy.

The first embodiment solves this problem by photographing a living body part to be registered several times and calculating the spatial position difference between the photographed images. Out of the photographed images, several blood vessel patterns where the position difference is large are selected and registered. This increases the probability of finding, among plural patterns registered as registration data, a registered pattern that is positioned similarly to a pattern picked up for matching. The authentication accuracy is thus enhanced despite employing a flat interface.

Figure 6:
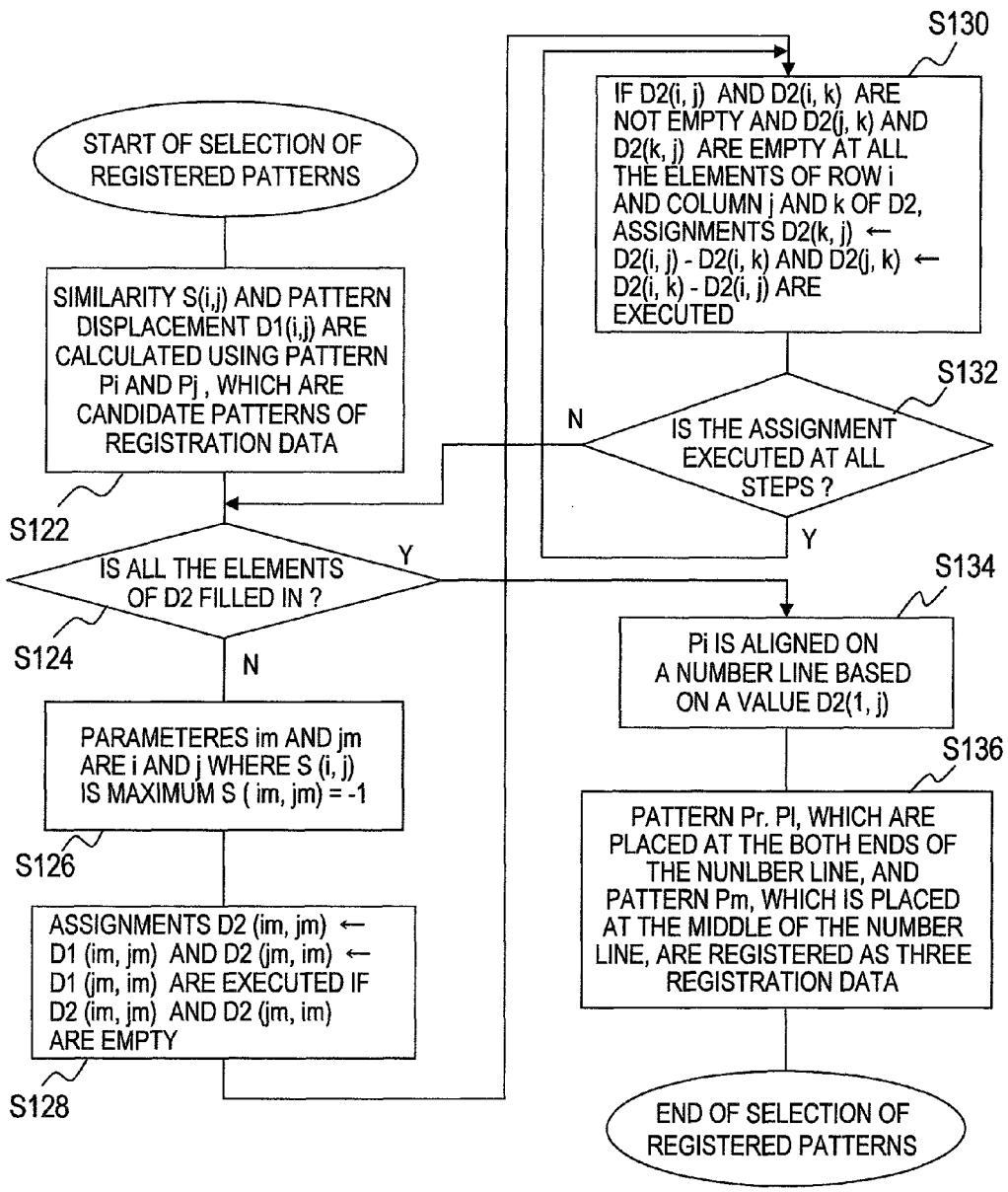
FIG. 6 is a flow chart for registration data selection processing of the authentication processing unit according to the first embodiment of this invention.

FIG. 6 is a flow chart showing an example of how to select plural patterns registered as registration data out of vein patterns obtained through repeated photographing. Described here is a method in which three patterns registered as registration data are selected out of vein patterns obtained by photographing the finger 1 five times, but how many patterns are to be selected can be set arbitrarily.

The five vein patterns photographed are denoted by P1, P2, P3, P4 and P5. Each of the photographed vein patterns is paired with every one of the rest of the photographed vein patterns to check the match. In checking the vein patterns against each other, common image matching methods can be employed, preferably, ones that can detect not only the similarity between two patterns but also how large a spatial position difference is when the similarity is highest. To be specific, the similarity is calculated while changing areas where two vein patterns overlap each other to obtain the maximum similarity and the amount of position difference. When a pattern Pi is checked against a pattern Pj (i and j are each an arbitrary natural number equal to or larger than 1 and equal to or smaller than 5, i≠j), a similarity S (i, j) obtained as a result of the matching and a position difference amount (displacement) D1 (i, j) calculated directly are stored separately. This processing corresponds to Step S122 in FIG. 5.

When the coordinate of the finger 1 in the longitudinal direction is given as y and the coordinate of the finger 1 in the lateral direction is given as x, the finger position difference amount may be defined as the amount of difference of the x coordinate alone, the amount of difference of the y coordinate alone, or the combined difference amount of the x coordinate and the y coordinate. In the authentication device of FIG. 3A and FIG. 3B where the width of the opening 27 in the longitudinal direction of the finger 1 is short relative to the length of the finger 1, the position difference in the longitudinal direction of the finger 1 particularly greatly affects the authentication accuracy, and raises the probability of failed authentication. This embodiment therefore focuses on the position difference of the y coordinate alone. A direction from the fingertip toward the root of the finger 1 is defined as the forward direction in the difference of the y coordinate.

Next, defined is a position difference amount (displacement) D2, which is calculated indirectly to find out the relative position of the five patterns. D2 is calculated in the subsequent processing from the previously obtained D1. D2 is initialized and emptied beforehand, and values are substituted into D2 with the progress of the calculation. In Step S124, whether D2 is empty or not is judged. When it is found as a result that D2 is not empty, it means that all elements are filled, and the processing proceeds to Step S134 as final processing.

D2 is calculated from D1 for the following reason: The amount of position difference between every pair of patterns is stored as D1, and the amount of position difference between the patterns Pi and Pj is represented by D1 (i, j). In the case where the position difference between Pi and Pj is large and the two patterns share no common areas, it is difficult to directly calculate the accurate amount of position difference between the two. When there is another pattern Pk, which shares areas with Pi and Pj both, it is probable that the accurate amount of position difference between Pi and Pj is obtained by combining the position difference amount D1 (i, k) of Pi and Pk with the position difference amount D1 (k, j) of Pk and Pj. This is why the position difference amount is calculated indirectly in this embodiment.

Next, the largest similarity S (i, j) of all is obtained, and i and j that give the maximum S (i, j) value are determined as im and jm, respectively. The value of S (im, jm) is then updated with a negative number so that the same S (i, j) is not selected in the subsequent repeated processing (S126).

In the case where D2 (im, jm) is empty, the value of D1 (jm, im) is substituted into D2 (S128). As to transposed elements which are obtained by switching a row and a column, only plus and minus of the position difference amount differs, and values are also substituted into transposed elements at this point.

Processing of filling empty elements of D2 with the values stored as D2 at present is executed next (S130). As mentioned above, when the position difference between Pi and Pj is so large that there are no common vein pattern areas shared by Pi and Pj, the patterns have very low similarity. Therefore, in order to obtain the accurate amount of position difference between Pi and Pj, calculating D1 (i, k) and D1 (k, j) through Pk which is interposed between Pi and Pj is better than directly calculating D1 (i, j). In this indirect approach, when one element D2 (k, j) is empty, a higher D2 precision is obtained by generating from values existing as D2 than by substituting D1 (k, j) since D1 values of high similarity are preferentially stored as D2. D2 can be generated by finding k that fulfils Expression 1.

$$D2(i,j)=D2(i,k)-D2(k,j) \quad (1)$$

This processing is performed on every empty element of D2. Of course, the substitution is not possible when the right side member is empty. As described above, the same substitution is concurrently performed on transposed elements.

Next, whether the substitution is executed in one step back (S130) or not is checked (S132). In the case where the substitution is executed, there is a possibility that executing the processing repeatedly may yield new elements on which the substitution can be performed, and the preceding step is repeated until there are no elements to be substituted. Then the processing returns to Step S124 to judge whether to end the processing.

When it is judged in the termination judgment (S124) that every element of D2 has been filled, the last step is executed. First, Pi is aligned on a number line based on a position difference amount that is obtained across the row of D2 (1, i) (S134). Then, three patterns, namely, a pattern Pr and the pattern P1, which are at the very ends, and a pattern Pm, which is near the middle point between Pr and P1, are selected as registration patterns, and the registration pattern selection processing is ended.

FIG. 7A and FIG. 7B show an example of the registration data selecting processing (S122) in the flow chart of FIG. 6. The similarity S and the directly calculated position difference amount D1 are stored for every one of the patterns P1 to P5. A dotted line indicates that an element is filled with some numerical value, but does not specifically show which numerical value it is. For instance, according to FIG. 7A, the largest S value, 98, is the similarity between P1 and P2. The positional relation between P1 and P2 is shown by D1 according to FIG. 7B, and P2 is about two pixels away from P1 in the fingertip direction.

FIG. 8A and FIG. 8B show a calculation example of the indirectly calculated position difference amount D2, which is generated from D1. In this calculation example, S and D1 have values shown in FIG. 7A and FIG. 7B, respectively. FIG. 8A shows D2 in the process of being created in Steps S128 and S130 of FIG. 6. First, S (1, 2), which is the maximum S value, is searched for and the value of D1 (1, 2) associated with S (1, 2) is stored as D2 (1, 2) without any changes. Next, the second largest S value, S (1, 4) is found and the value of D1 (1, 4) is stored as D2 (1, 2). It is understood at this point that there is a positional relation that places P1 between P2 and P4. Therefore, +4, which is a value obtained by subtracting the value of D2 (1, 2) from the value of D2 (1, 4), is substituted into D2 (2, 4). According to FIG. 7B, +8 is stored as the value of D1 (2, 4) and greatly differs from the just calculated D2 (2, 4). However, according to FIG. 7A, the similarity S (2, 4) is very low at 26, and the reliability of D1 (2, 4) is low. The calculation referring to the value of D2 as shown in FIG. 8A therefore yields more accurate position difference amount. Eventually, all D2 elements are filled in this manner as shown in FIG. 8B. The row of P1 of the completed D2 table shows the relative position of the five patterns.

Figure 9:
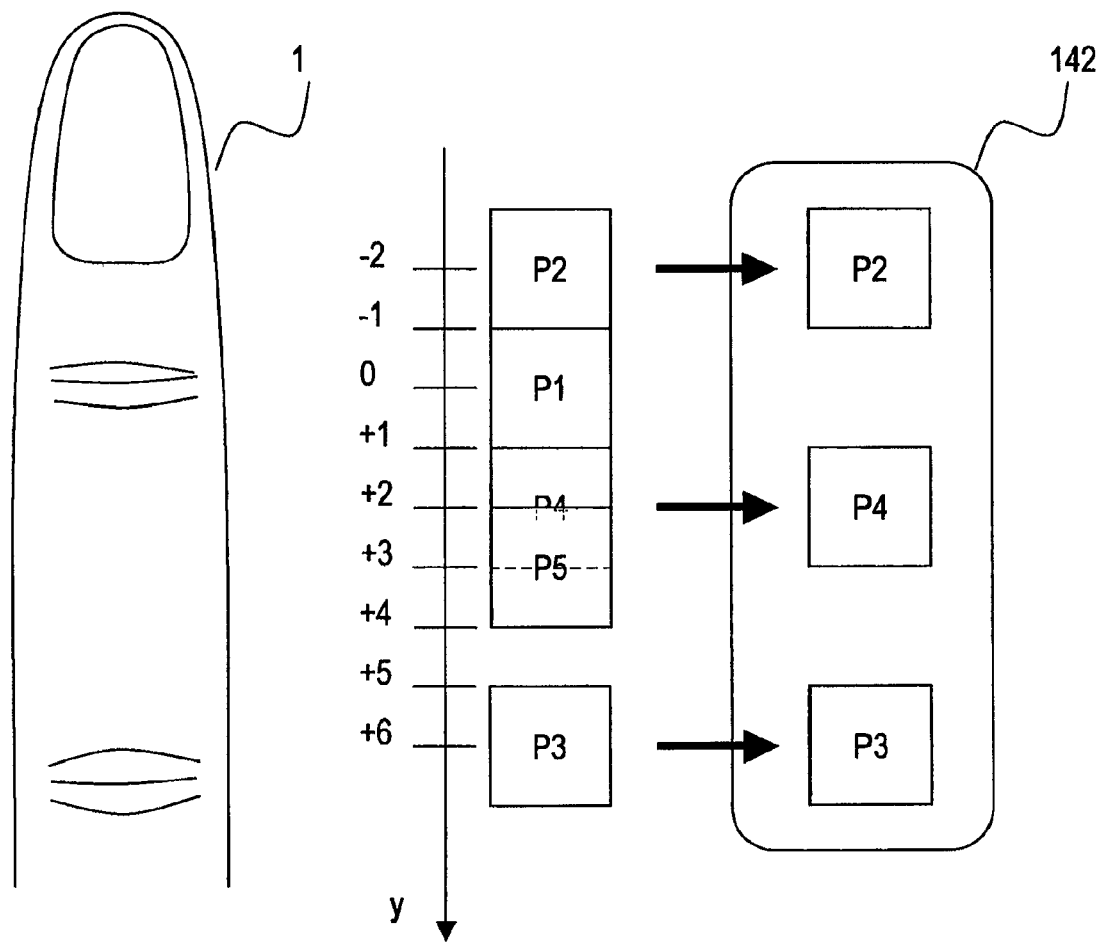
FIG. 9 is an explanatory diagram of the registration data selection processing of the authentication processing unit according to the first embodiment of this invention.

FIG. 9 shows an example of a conceptual diagram in which the five patterns are aligned on a number line based on the values in the row of P1 in FIG. 8B. P1 is placed at 0 on the number line, and P2 to P5 are places at their respective positions. It is understood from FIG. 9 that a pattern obtained by photographing a finger area closest to the fingertip is P2 whereas P3 is a pattern obtained by photographing a finger root side area. A pattern that is closest to the center is P4. Extracting two patterns at the ends and one pattern in the middle like this produces a registration data set 142, which covers the broadest range. When this data set is registered, there is an increased chance that one of the three patterns matches even when a user positions the finger 1 incorrectly causing a position difference in the longitudinal direction of the finger 1. Thus, the recognition rate is raised, authentication can be made without requiring the strict positioning of the finger 1, and the user-friendliness is enhanced.

In the case where M patterns out of N photographed patterns are registered, patterns selected to be registered should be of as far apart photographed areas as possible, as in this embodiment where three patterns out of five photographed patterns are registered. Among blood vessel patterns extracted from three images, a pair that has the largest position difference is chosen by comparing a position difference between the first and second patterns, a position difference between the first and third patterns, and a position difference between the second and third patterns. To be specific, by the same method, registration patterns are selected by repeating the processing of aligning registration data candidates on the number line, choosing patterns at the very ends, and choosing a pattern in the middle. Patterns at regular intervals may be selected until the given M patterns are registered. Alternatively, patterns where the position difference from adjacent photographed images is equal to or larger than a given amount may be registered.

In the case where a living body is hardly shifted through several photograph shots for registration, creating an overall small position difference amount, registration pattern candidates may be selected without using D2. The fact that the overall position difference amount is small is detected when the similarity is high in every pair made by pairing all registration pattern candidates in a round robin manner and the position difference amount is small in every pair. In this case, the first processing in FIG. 6 (S122) is immediately followed by the processing of aligning captured feature patterns on a number line (S136), and the intervening processing can be omitted. However, Step S136 in this case uses D1 instead of D2. In this way, the registration processing is simplified.

Now, a description will be given on matching processing of a case where there are several matching patterns registered according to the flow chart described above.

Figure 10:
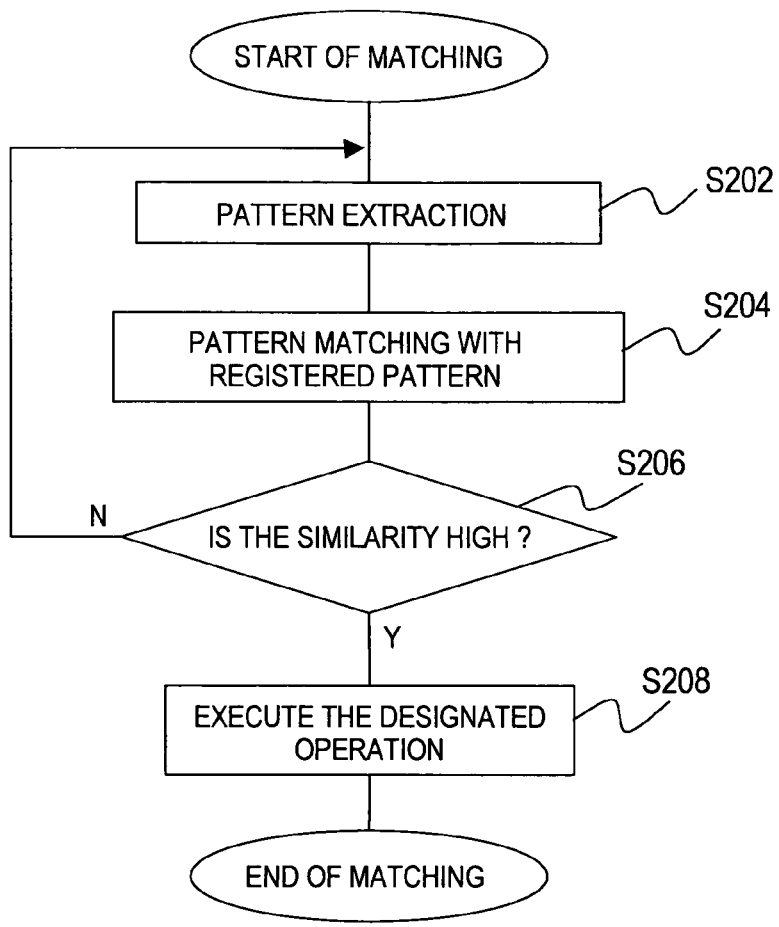
FIG. 10 is a flow chart for authentication processing of the authentication processing unit according to the first embodiment of this invention.

This embodiment is characterized by matching processing (S204) and similarity judging processing (S206) of FIG. 10. As mentioned above, there are M vein patterns registered for one finger. Accordingly, an extracted vein pattern is checked against the M registered patterns.

The calculated similarity is evaluated next (S206). A degree of matching high enough to make two vein patterns statistically judged as identical is defined in advance in numerical terms. The evaluation is performed for a registered user on a pattern that has the highest similarity out of the M registered patterns. When the similarity obtained as a result of the matching processing exceeds a threshold at which two patterns are judged as identical, the user is authenticated as a registered user. When the similarity does not exceed the threshold, the user is not authenticated as a registered user and the processing returns to the head of the flow chart of FIG. 10.

1-N authentication in which an extracted vein pattern is checked against registration data of every registered user takes long to complete the matching processing and lowers the user-friendliness when many users are registered and the value of M is large since there are M patterns registered as registration data per registered user. The matching processing can be sped up by the following method.

First, data obtained by thinning the feature amount from registration data is created in advance for every pattern registered as registration data, and stored along with the registration data. Thinning of the feature amount may be accomplished through spatial reduction of a feature pattern. In the case of structural feature data about end points, branching points and the like, feature points may be prioritized so that low priority feature points are removed. Plural pieces of thinned data having different thinning rates may be created from the same original data. In addition to thinned data of registration data, thinned data of vein data of a living body presented for authentication is created in a similar manner.

Next, every pattern registered as registration data is checked against data that has the highest thinning rate. The matching can be sped up since the data size has been reduced. On the other hand, with high thinning rate data which lacks detailed feature amounts, the probability of correctly discriminating one finger from another is lower than that in a case where original data, which is not thinned, is used. However, thinned data manages to produce relatively very low similarity when obviously different patterns are checked against each other. Accordingly, a threshold at which two patterns are judged as obviously different patterns is statistically set in advance. It is judged that registration data having a similarity smaller than the threshold is not of a finger currently presented for authentication, and the registration data is excluded from the subsequent matching processing.

Thereafter, registration data that is still eligible as subjects of matching processing receives the same matching processing as the one described above except that data of the second highest thinning rate is used. Since some of registration data patterns have been excluded from matching processing subjects through the previous matching processing, a reduced number of registration data patterns are checked in a shorter period of time. As in the previous matching processing, registration data that is obviously not of a finger currently presented for authentication is excluded from subjects of matching processing. In this way, registration data subjected to matching processing is gradually narrowed down while switching matching data from higher thinning rate data to lower thinning rate data.

Lastly, registration data narrowed down through previous matching processing is checked using original data which is not thinned. This matching processing takes longer than any of the previous matching processing, but is still completed within a short period of time since, after the previous matching processing, only a few registration data patterns are left to be checked.

The overall matching processing time is shortened by thus narrowing down registration data to be checked with the use of data that can be checked quickly.

As has been described, it is important to obtain plural patterns as registration data that takes into consideration a position difference of a living body in order to accomplish authentication that is not affected by the position difference. Therefore, a living body has to be photographed for registration several times while varying the position of the living body as much as possible within a range in which the living body is expected to be placed in matching processing. Also, it is preferable to burden a user to be registered as less as possible in photographing. In view of these points, there is provided a registration data collecting method described below in which plural pieces of living body information are obtained at different positions to improve the authentication accuracy.

FIG. 5 is a flow chart of another method of the registration processing in this authentication device. In this mode, a user is prompted to reposition his/her finger in photographing plural patterns, so that images of the finger at different positions where the user is expected to place the finger on the authentication device are obtained. The thus registered data absorbs a natural fluctuation in finger position upon authentication, making correct authentication possible despite the fluctuation.

The registration processing is started when registration right is validated and a switch is made to a registration mode after a vein authentication program is activated. Registration right is confirmed when a registerer password is entered or when a person whose vein pattern is registered in advance as a registration manager shows the device the registered living body.

When the registration processing is started, whether a finger is on the input device 2 or not is checked first (S101). In this mode, the light sources 23 are flashed rapidly and the difference between an image picked up when the light sources 23 are on and an image picked up when the light sources 23 are off is calculated. When there is a finger on the input device 2, the finger is lit brightly while the light sources 23 are on whereas an area where the finger is placed provides a dark shadow while the light sources 23 are off. The background of the finger shows no change in images irrespective of whether the light sources 23 are on or off. Utilizing this fact, the absolute value of the difference between the image picked up when the light sources 23 are on and the image picked up when the light sources 23 are off is calculated, and an area where the calculated absolute value is large is judged as a finger area. When the extent of this finger area is deemed as a general finger size, which is set in advance, it is judged that a finger is on the input device 2. The next step is started in the case where a finger is detected whereas this processing is repeated in the case where a finger is not detected (S102). According to this method, finger detection can be made by the vein pattern photographing light sources 23 alone, and the input device 2 can be reduced in cost and size. Alternatively, a sensor for detecting a contact with a finger may be installed in the input device 2 to physically judge whether a finger is on the input device 2 or not in the processing of Step S101.

Next, a vein pattern is extracted (S104). In vein pattern extraction processing, the light control program 122 shown in FIG. 2 adjusts the amount of light of the light sources 23 to extract a vein pattern. When the intensity of light emitted from the light sources 23 is adjusted properly, a vein pattern can be photographed as dark lines. A vein pattern is extracted by extracting the dark lines and removing an unnecessary background. This processing employs, for example, line component enhancement using a matched filter or other edge enhancing filters, statistical extraction of line components through repeated line tracing, dark line extraction through top-hat transformation or other morphology operations, and detection of a local dip in luminance value in an image luminance profile to enhance the center of the dip based on the dark line width, the curvature of the dip, or the like.

Examples of the amount of light control method executed by the light control program 122 of FIG. 2 include one in which a mean image luminance value of when a vein pattern is clearly visible is obtained in advance and the amount of light is controlled such that an image has the objective mean luminance value, and one in which a vein pattern is extracted from an image and the light intensity is determined such that the extracted line pattern has the optimum degree of correctness and sharpness. The former method, in particular, requires low calculation cost and speeds up the processing.

In order to obtain the optimum amount of light, the amount of light has to be controlled while constantly monitoring the image. The amount of light adjustment in this mode includes the following steps. First, on the assumption that the mean image luminance value can be described as a light intensity function, the mean image luminance value is modeled as a linear function, an n-th order curve function, or the like that resembles the real value most. Next, a certain amount of light is actually given and a mean image luminance value at this amount of light is calculated to determine the offset value, slant, and other parameters of the model function. Lastly, a light intensity at which the objective mean image luminance value is obtained is calculated reversely from the model function, and the finger 1 is irradiated with light having the calculated intensity. This method can make the luminance value swiftly converge to an objective value. The fingertip side light sources 23 and the finger root side light sources 23 may be controlled separately from each other, so that an image is divided into a fingertip side area and a finger root side area and each area is irradiated with an optimum amount of light. This makes it possible to photograph a vein pattern image that is clear throughout.

Next, whether the finger has been lifted from the input device 2 or not is checked (S106). To be specific, the technique used in Step S101 is employed. This processing is repeatedly executed until the finger is lifted. The processing may include giving an instruction to lift the finger 1 using the display 15, the speaker 17, the guide lamps 43 or others so that the user realizes the need to lift the finger from the input device 2. Thus a user requesting registration presents a finger to be registered on the input device 2 anew each time the finger is photographed. Usually, the finger position shifts when a finger is lifted from the input device 2 and then placed on the input device 2 again. By making a user lift his/her finger and then place the finger again, the finger is prevented from staying in the same position and plural vein patterns are obtained at different positions where the user is expected to place the finger on the input device 2. When the obtained plural patterns are registered as registration data, there is an increased chance that one of the patterns registered as registration data matches a newly entered picked up image that has a natural position difference, and the recognition rate is improved.

Next, vein patterns extracted in Step S104 are stored as candidates for registration data (S110). Then whether or not the count of registration data candidates has reached a preset number N is judged (S112). Here, N is 2 or larger. In the case where the count of registration data candidates is smaller than N, the processing returns to S102 to repeat the above-described processing of Step S102. The processing of storing registration data candidates in S110 may be executed immediately after the pattern extraction processing of S104.

Next, out of the obtained N registration pattern candidates, M patterns that are actually registered are selected (M≤N) (S114). The selection is made such that the photograph positions of the M patterns are further apart from one another than from the rest of the N patterns. In this way, the finger position difference is greatly absorbed and the recognition rate is improved. Moreover, since only effective data remains whereas less effective data is removed, the size of registered data is reduced and the matching processing is quickened. This specific mode is as shown in FIG. 6 to FIG. 9, which have been described above.

Lastly, the M registration patterns selected in the preceding processing are stored in a database as biometric information of the user requesting registration (S116). In this mode, however, since it is judged that the finger has been repositioned in the process of picking up images of registration pattern candidates as mentioned above, and images have been obtained at different positions where the user may possibly place the finger, Steps S114 and S116 may be omitted and all of registration pattern candidates may be determined as registration patterns.

The values of N and M in this mode may be given values set in advance, or may be variable so that users can choose freely. The value of M may be determined automatically by the system each time by calculating the similarity between N patterns, grouping together patterns that have a similarity within a given range, and employing the number of the groups. In this case, unnecessary patterns among plural vein patterns obtained in the registration operation are not registered while making sure that necessary patterns are registered. Furthermore, when the value of M is smaller than a preset minimum value, the registration processing is executed continuously and a user requesting registration is repeatedly prompted to present a pattern until enough patterns are obtained.

In the above-described steps, time out for resetting the registration processing may be set in the waiting processing (S102, S106) for a finger to be placed or to be lifted. Setting the time out prevents the light sources 23 from keeping on flashing for a long period of time after the registration processing is interrupted, and thus reduces power consumption. It also prevents the authentication device from inadvertently registering a finger of a person who has no intention of being a registered user or who is not deemed appropriate as a registered user.

As has been described above, this mode requests a user to position displacement of his/her finger to cause a natural position difference that can happen upon matching. Out of patterns photographed at different positions by causing the position difference, ones that can cover the position difference upon matching most are selected as registration data. The reposition operation is also effective for users in getting the hang of the operation in matching, and provides the chance of practicing operating the authentication device. Accordingly, patterns that strongly reflect those photographed in matching are obtained upon registration, and the recognition rate is enhanced.

Figure 11:
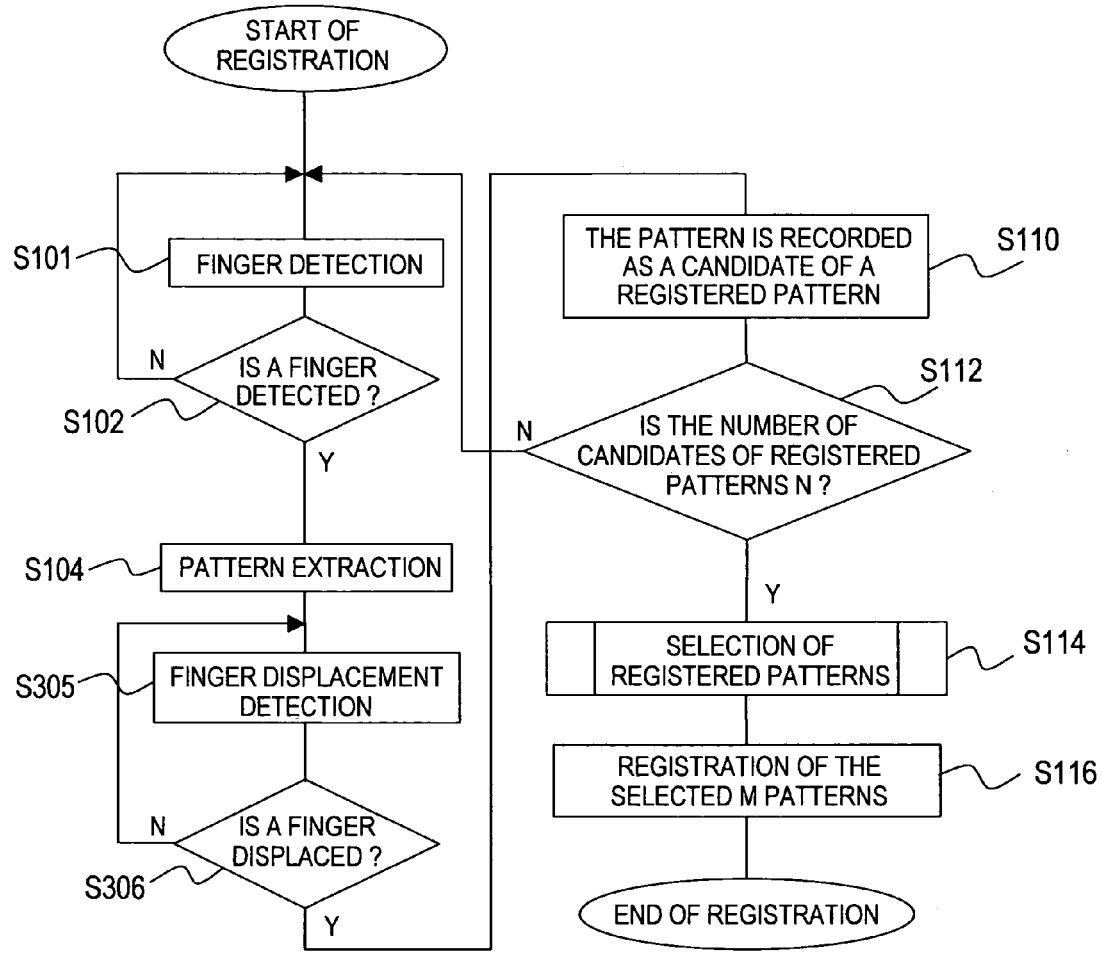
FIG. 11 is a flow chart for registration processing of an authentication processing unit according to a second embodiment of this invention.

FIG. 11 shows registration processing executed by the authentication device according to a second embodiment. The difference from the registration processing described in the first embodiment with reference to FIG. 5 is that the processing of detecting that a finger is not on the input device 2 is replaced with processing of detecting a finger position difference (S306).

It is important to obtain plural patterns as registration data that covers position shifts of a living body in order to accomplish authentication that is not affected by the position differences. This embodiment therefore requests users to freely move a finger placed on the input device 2. Alternatively, a user is instructed to move a finger by the system. By prompting users to place a finger at every possible position, plural finger images of different positions are obtained. Patterns where the position difference amount is large are selected out of the thus obtained images, so that authentication that tolerates a great deal of position difference is accomplished.

The authentication processing unit 10 in the second embodiment measures the position difference amount of the finger 1. The system requests a user requesting registration to place the finger 1 at different positions. The user may lift the finger 1 and then place the finger 1 down each time as in the first embodiment, or may change the position of the finger 1 by sliding the finger 1 over the input device 2. The authentication processing unit 10 photographs plural vein patterns while the finger 1 is repositioned. The system may use the display 15, the speaker 17 or the like in prompting users to move the finger 1. The system may give users a visual instruction by graphically illustrating a direction and a distance in which the finger 1 is moved. In this case, a user requesting registration may place the finger 1 according to the instruction.

In this embodiment, the position difference in the longitudinal direction of the finger 1 is taken into consideration, and a user requesting registration is requested to move the finger 1 in its longitudinal direction (for example, to shift the finger 1 gradually from the root toward the fingertip). In this way, images of the finger 1 at different positions in the longitudinal direction, which are positions where the finger 1 may be placed in authentication, can be obtained efficiently. It is also possible to allow a user requesting registration to shift the position of the finger 1 at the user's discretion, placing importance on obtaining images at positions where the user can place the finger 1 on this authentication device.

The authentication processing unit 10 of this embodiment contains a unit to measure the position difference amount. Whether or not the finger 1 has been moved is judged by extracting feature patterns in succession and checking the match in a time series manner. The amount of position difference between the extracted patterns is measured to judge whether the position of the finger 1 has been shifted or not. This eliminates a sensor for detecting the finger movement, and lowers the cost of the input device 2. Alternatively, the movement of the finger 1 may be detected by a movement detecting unit such as a rotary encoder installed on the finger placing surface 25. Steps S305 and S306, which are steps of judging whether the finger position is being shifted or not, are inserted in the processing of obtaining registration images in succession shown in FIG. 11. In the case where no change in finger position is detected, the user requesting registration may be warned to move the finger 1 in the middle of the registration processing. Thus a situation can be avoided where the count of images selected to be registered through the selection processing of Step S114 is found to be short of the given number M after photographing plural images. Furthermore, the registration processing according to the second embodiment is quick since a user requesting registration is allowed to move the finger 1 while keeping the finger 1 placed on the finger placing surface 25 instead of lifting the finger 1 and then putting down the finger 1 again. In addition, the second embodiment ensures that images are photographed at different positions, and can absorb a greater deal of accidental finger position fluctuation in authentication.

This invention is favorably applied to individual authentication devices mounted to personal computers, portable terminals, ATMs, automobiles, room access management systems, and the like.

While the present invention has been described in detail and pictorially in the accompanying drawings, the present invention is not limited to such detail but covers various obvious modifications and equivalent arrangements, which fall within the purview of the appended claims.

What is claimed is:

1. A biometric information processing device, comprising:
   a placement surface on which a part of a living body whose image is to be picked up is placed;
   a light source for irradiating said part of the living body with light;
   an image pickup unit for repeatedly picking up light that has been transmitted from the light source through said part of the living body to obtain a totality of registration image candidates, a part of each of the registration image candidates indicating biological information of the living body, and a difference between at least two of the registration image candidates being a result of a change in position of said part of the living body which is a positional difference of the biological information in a registration image candidate; and
   a processing unit for processing the totality of registration image candidates to obtain a plurality of registration image candidates that each differ as a result of the change in position of said part of the living body,
   wherein the processing unit analyzes the plurality of registration image candidates that each differ as a result of the change in position of said part of the living body to calculate a degree of similarity of each of the plurality of registration image candidates with respect to each of the other of the plurality of registration image candidates,
   wherein the processing unit groups the plurality of registration image candidates into plural groups based on the degree of similarity of each of the registration image candidates within a predetermined range, and
   wherein the processing unit obtains a registration image from each of the plural groups of registration image candidates.

2. The biometric information processing device according to claim 1, wherein the processing unit judges whether or not the there is a difference in a position of biological information from a picked up image from the position of biological information of a registration image candidate that is picked up last time, and when it is judged that there is a position difference between the biological information, the biological information from the recent pickup image is determined as a new registration image candidate.

3. The biometric information processing device according claim 1, wherein said part of the living body is a finger.

4. The biometric information processing device according to claim 3, wherein the difference in position is a position difference in the longitudinal direction of the finger.

5. The biometric information processing device according to claim 1, wherein the processing unit instructs to place said part of the living body on the placement surface again after the registration image candidates are obtained.

6. The biometric information processing device according to claim 1, wherein the processing unit performs individual authentication by checking biological information that is extracted from a newly picked up image of said living body part against each of the registration images.

7. The biometric information processing device according to claim 1, wherein the light source is placed under the placement surface.

8. A biometric information processing device according to claim 1,
   wherein the image pickup unit picks up a first image when the light source is on, and a second image when the light source is off,
   the processing unit calculates a difference between the first image and the second image, and
   the processing unit judges that the living body is placed on the placement surface in a case where an area in which the calculated difference is larger than a predetermined value is wider than a given space.

* * * * *